US012676418B2

(12) United States Patent
Weinzierle et al.

(10) Patent No.: US 12,676,418 B2
(45) Date of Patent: Jul. 7, 2026

(54) WAVEGUIDE CONSISTING OF TWO-HALF SHELLS

(71) Applicant: VEGA Grieshaber KG, Wolfach (DE)

(72) Inventors: Christian Weinzierle, Wolfach (DE);
Steffen Wälde, Niedereschach (DE);
Tobias Bader, Haslach (DE)

(73) Assignee: VEGA Grieshaber KG, Wolfach (DE)

( * ) Notice: Subject to any disclaimer, the term of this patent is extended or adjusted under 35 U.S.C. 154(b) by 37 days.

(21) Appl. No.: 18/591,113

(22) Filed: Feb. 29, 2024

(65) Prior Publication Data

US 2024/0305002 A1 Sep. 12, 2024

(30) Foreign Application Priority Data

Mar. 7, 2023 (EP) .................................... 23160584

(51) Int. Cl.
H01Q 13/02 (2006.01)
G01S 7/03 (2006.01)
H01Q 1/38 (2006.01)

(52) U.S. Cl.
CPC ........... H01Q 13/0283 (2013.01); G01S 7/03 (2013.01)

(58) Field of Classification Search
CPC .... H01Q 1/225; H01Q 13/02; H01Q 13/0258; H01Q 19/08; H01Q 1/002; H01Q 1/42; H01Q 13/085; H01Q 13/28; H01Q 19/062; H01Q 19/10; H01Q 19/13; H01Q 9/04; H01Q 9/0407
See application file for complete search history.

(56) References Cited

U.S. PATENT DOCUMENTS

| | | | | |
|---|---|---|---|---|
| 9,178,258 | B1 | 11/2015 | Brown | |
| 11,557,841 | B2 * | 1/2023 | Kienzle | H01P 3/165 |
| 11,774,277 | B2 * | 10/2023 | Dieterle | G01F 23/284 |
| | | | | 342/124 |
| 11,841,261 | B2 * | 12/2023 | Baur | H01Q 1/225 |
| 2002/0057226 | A1 | 5/2002 | Koh et al. | |
| 2004/0130498 | A1 * | 7/2004 | Woetzel | H01Q 19/13 |
| | | | | 343/786 |
| 2010/0066594 | A1 * | 3/2010 | Kienzle | H01Q 13/02 |
| | | | | 343/753 |

(Continued)

FOREIGN PATENT DOCUMENTS

| | | |
|---|---|---|
| CN | 105514565 A | 4/2016 |
| CN | 107052709 A | 8/2017 |

(Continued)

OTHER PUBLICATIONS

EP 23 16 0584.1 Office Action dated Jan. 23, 2025.

(Continued)

*Primary Examiner* — Wei (Victor) Y Chan
(74) *Attorney, Agent, or Firm* — Wood Herron & Evans LLP

(57) ABSTRACT

A radar measuring device having a radio frequency unit for generating and/or receiving electromagnetic waves using an antenna for directional radiation of the electromagnetic waves, in which a waveguide for transmitting the electromagnetic waves is arranged between the radio frequency unit and the antenna is formed from two half-shells extending in the longitudinal direction of said waveguide.

15 Claims, 7 Drawing Sheets

(56) References Cited

U.S. PATENT DOCUMENTS

Figure 1A:
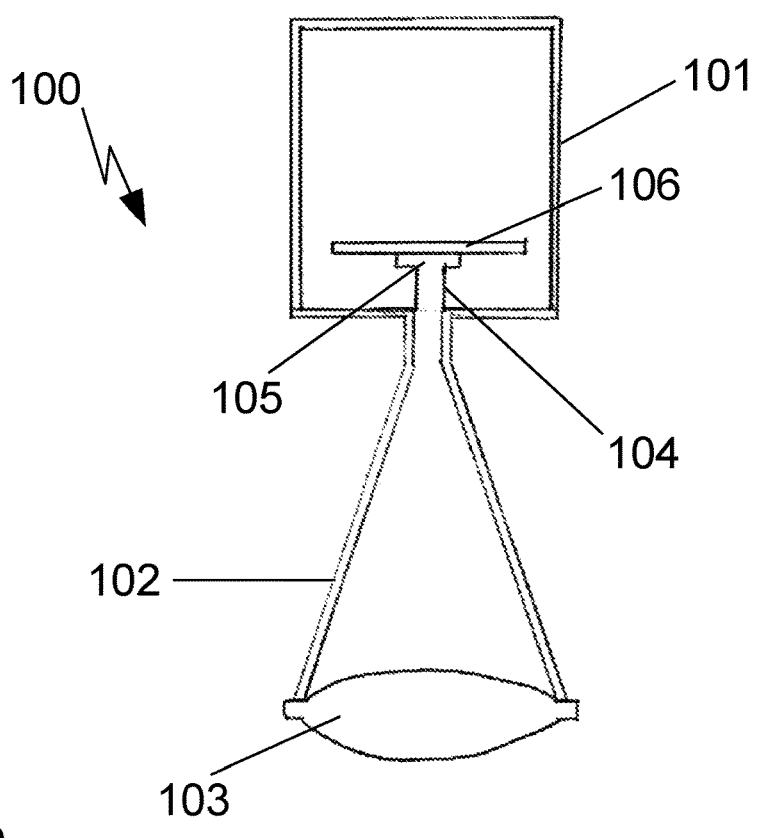

| | | | |
|---|---|---|---|
| 2012/0153969 A1* | 6/2012 | Eckert | H01P 5/087 |
| | | | 324/637 |
| 2020/0235452 A1 | 7/2020 | Kienzle et al. | |
| 2020/0264265 A1* | 8/2020 | Schultheiss | G11C 5/148 |
| 2021/0305673 A1* | 9/2021 | Ohlsson | H01P 5/107 |
| 2023/0246318 A1* | 8/2023 | Fonseca | H01P 1/161 |
| | | | 333/137 |
| 2024/0023230 A1* | 1/2024 | Berthier | H05K 1/0243 |

FOREIGN PATENT DOCUMENTS

| | | | |
|---|---|---|---|
| DE | 102020131550 A1 | 6/2022 | |
| DE | 102020133194 A1 | 6/2022 | |

OTHER PUBLICATIONS

Zhu et al., "Versatile Manufacturing of Split-Block Microwave Devices Using Rapid Prototyping and Electroplating", IEEE Antennas and Wireless Propagation Letters, vol. 16, 2017 pp. 157-160.
EP 23 16 0584 International Search Report dated Aug. 14, 2023.

\* cited by examiner

<u>Fig. 2</u>
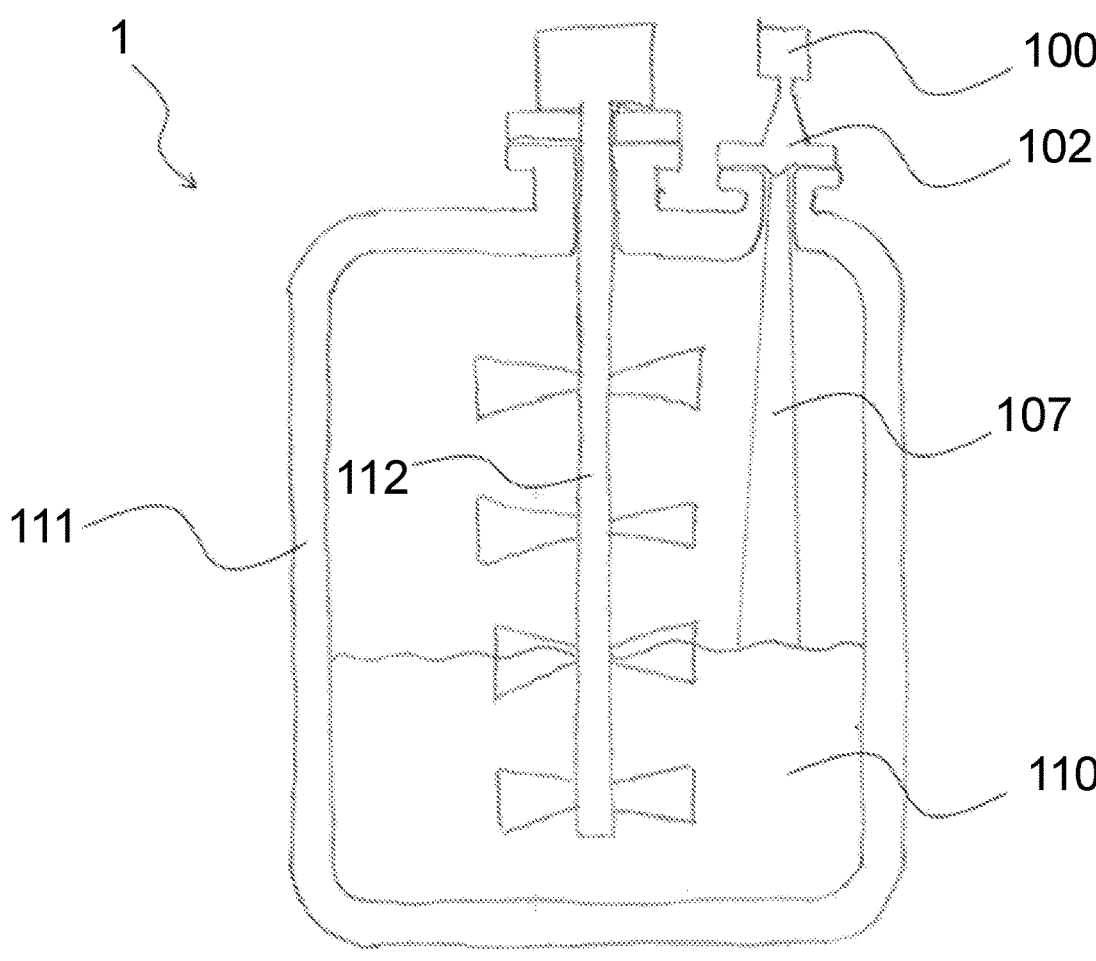

301a

401

500

301b

301a

501

WAVEGUIDE CONSISTING OF TWO-HALF SHELLS

RELATED APPLICATIONS

This Application claims priority from application Ser. No. 23/160,584.1 filed on Mar. 7, 2023, in European Patent Office. The entire contents of this application is incorporated herein by reference in their entirety.

The present invention relates to a radar measuring device according to the preamble of claim 1.

The state of the art includes different radar measuring arrangements, radar measuring devices and methods. The state of the art includes, for example, radar measuring arrangements and radar measuring devices used for level measurement purposes or, more generally, for distance measurement purposes in the field of process automation. For extending the recognition capabilities to moving objects, the state of the art also involves the determination of speed, to be carried out in a separate measurement, in addition to the determination of distance. This may be done either by using the same radar sensor or by using an additional radar sensor.

Due to their high degree of independence of external influences and to the development of higher operating frequencies, which are made possible by innovative semiconductor components, modern radar measuring devices can reliably yield very accurate measurement results. Known radar fill level measuring devices measure the distance to a filling medium and to other reflection points, hereinafter also referred to as reflectors, within a container by using a pulse transit time method or an FMCW method (frequency modulated continuous wave method).

In the field of automation technology applications, measurements have so far been mainly carried out using optical methods and measuring arrangements.

The term automation technology refers to a sub-field of technology that includes all measures required for the operation of machines and systems without the involvement of humans, so the sub-field of process automation can be understood as being the lowest degree of automation. Process automation is aimed at automating the interaction between individual components of a plant in the chemical, crude oil, paper, cement, shipping or mining sectors. A large number of sensors are known for this purpose, which are adapted, in particular, to the specific requirements of the process industry, such as mechanical stability, insensitivity to contamination, extreme temperatures and extreme pressures. Measured values from these sensors are usually transmitted to a control centre, where process parameters such as fill level, flow rate, pressure or density can be monitored and relevant settings for the entire plant can be changed manually or automatically.

Another sub-field of automation technology concerns logistics automation. Distance sensors and angle sensors are used in the field of logistics automation to automate processes within a building or within an individual logistics installation. Typical applications for logistics automation systems include the fields of luggage and freight handling at airports, traffic monitoring (toll systems), retail, parcel distribution and building security (access control). The above examples all have in common that presence detection in combination with precise measurement of the size and position of an object is a prerequisite that the respective applications have to meet. Since known radar systems are not yet able to fulfil these specific requirements, various sensors which rely on optical measurement methods using lasers, LEDs, 2D cameras or 3D cameras to detect distances according to the time-of-flight (ToF) principle, continue to be used in the known state of the art.

A third sub-field of automation technology concerns factory automation. Applications for this can be found in a wide variety of industries such as automotive manufacturing, food production, the pharmaceutical industry or, more generally speaking, in the field of packaging. Factory automation is aimed at automating the production of goods using machines, production lines and/or robots, i.e. at realising these steps without the involvement of humans. The sensors used here and the specific requirements in terms of measurement accuracy when recording the position and size of an object are comparable to those in the previous example of logistics automation. This is why sensors based on optical measurement methods are also commonly used on a large scale in the field of factory automation.

Optical sensors have so far dominated the fields of logistics automation, factory automation and safety technology. These are fast and inexpensive and can reliably determine the position and/or distance to an object due to the relatively easily focusable optical radiation on which the measurement is based. However, optical sensors have the significant disadvantage of requiring a great deal of maintenance, as even in the areas listed above, the sensor becomes dirty after a few thousand hours of operation, which can significantly impair the quality of the measurement. In addition, especially when used in production lines, the measurement can be impaired by oil vapours or by other aerosols involving mist formation, which can result in additional contamination of optical sensors.

In the process industry and particularly in process automation, radar measuring devices and especially radar fill level measuring devices are used reliably under harsh conditions, such as high and low temperatures as well as under extreme pressures, in dusty environments and in aggressive media.

Initially, radar measuring devices in the C-band established themselves on the market, which operate in the frequency range around 6 GHz and may be authorised for use in accordance with the regulatory authorities. These devices have the disadvantage of a large design, as the antenna size depends on the wavelength used. Consequently, radar measuring devices in the K-band were developed. The K-band refers to the frequency range around 25 GHz. The antenna sizes that can be achieved in this way are significantly smaller than the antennas required for the C-band. As of 2016, the first radar measuring devices operating in the W-band, i.e. the frequency range around 80 GHz, in particular a radar fill level measuring device for liquids, have been available on the market. In this way, very compact antenna designs can be realised, which also allow small process connections for arranging the radar measuring devices in a process environment.

A prior art radar measuring device 100, in this case a radar fill level measuring device, is shown in FIG. 1a.

The radar fill level measuring device 100 shown in FIG. 1a essentially has a housing 101. An electronic system arranged in the housing 101 has a printed circuit board 106 with a radio frequency (RF) unit 105 including a radar chip arranged on said printed circuit board 106. The radio frequency unit 105 contains, for example, transmitters and receivers for radio frequency signals in the desired frequency band.

According to the present application, a radio frequency unit is understood to be the part of a radar measuring device that generates, transmits, and receives radio frequency signals.

In the radar fill level measuring device 100 as shown in FIG. 1a, the RF unit 105 is coupled, via a waveguide 104, to a horn antenna 102 at the front end of which, when considered in the main radiation direction, a dielectric lens 103 is arranged. The waveguide 104 serves to guide the radio frequency signals emitted by the RF unit 105 from the RF unit 105 to a feed-in point of the horn antenna 102 with as little loss as possible and, conversely, to guide radio frequency signals received by the horn antenna 102 to the RF unit 105.

The length of the horn antenna 102 is largely responsible for the radiation characteristics of the horn antenna 102 and must be designed using calculations and simulations in such a way that all relevant approval aspects are fulfilled. In particular, defined opening angles and the prescribed side lobe suppression need to be observed here. The lens 103 is located at the front of the horn antenna 102 and is designed in such a way that the geometric length of the antenna is shortened as compared to a horn antenna 102 without a lens. In the present embodiment example, a convex-convex or biconvex lens 103, i.e. a lens with two outwardly curved surfaces, is shown. In this way, a compact design can be realised.

Figure 1B:
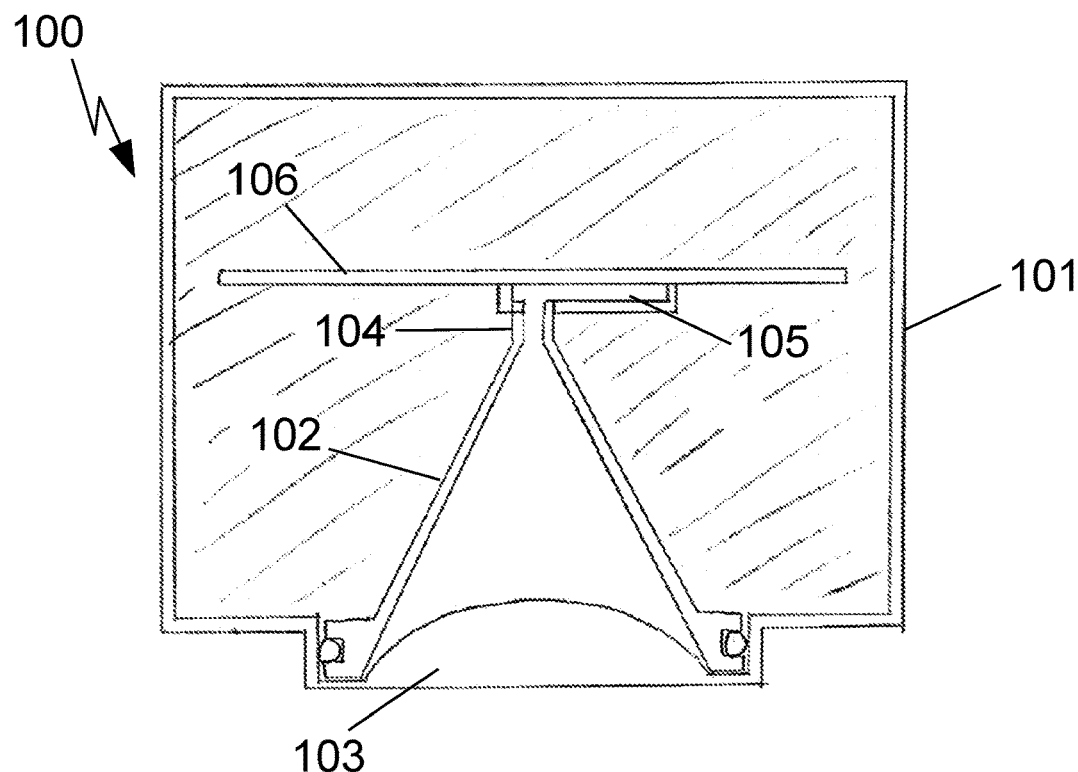

FIG. 1b shows a further embodiment of a radar fill level measuring device 100 according to the state of the art, wherein, in comparison to the embodiment of FIG. 1a, the lens 103 has a plano-convex design, i.e. a forward-facing surface of the lens 103, orientated towards the process, is planar and a surface of the lens 103 facing into the antenna horn is convex.

In addition to providing a more compact antenna design, the lenses 103 also offer the advantage that of functioning as a separation with respect to the process and the process medium. The measuring electronics arranged on the printed circuit board 106, and in particular the RF unit 105, can be protected from high and low pressures and temperatures, dust, moisture and other detrimental environmental conditions for the measuring electronics by means of the lens 103.

The lenses 103 are often designed in such a manner as to have other properties in addition to good high-frequency properties. These may include, for example, drip cones or drip edges that are designed in such a way that condensate depositing on the lens 103 can advantageously drip off quickly or rainwater present on the side of the antenna will not run directly in front of the lens.

The horn antenna 102 may either be located outside the appliance housing 101 (see FIG. 1a) or may be internal to said housing (see FIG. 1b).

FIG. 2 shows a possible application scenario for radar measuring devices 100 as described in connection with FIGS. 1a and 1b in the form of a radar fill level measuring device 100 located within a container 111.

Since the early 1990s, modern fill level measuring devices have been designed as radar fill level measuring devices 100 and, due to their positive properties, are increasingly superseding other measuring devices that work on ultrasonic or optical principles from the marketplace. Over the years, advances in semiconductor technology have made it possible to achieve higher and higher signal frequencies. This has enabled 80 GHz FMCW radar sensors to be developed from the original 6 GHz pulse time-of-flight radar measuring devices.

The development of higher frequency ranges has the advantage that smaller antenna designs (or greater antenna gain with the same aperture) can be realised, which brings advantages in many respects.

The radar fill level measuring device 100 shown in FIG. 2 is mounted via a flange formed on the container 111 whose filling medium fill level 110 is to be determined by means of the radar fill level measuring device 100. Due to the technology used in the construction of the radar fill level measuring device 100, it is possible that an opening angle of a main lobe 107 of the antenna directivity patterns is so small that interfering reflectors, e.g. an agitator 112 as shown in FIG. 2, will even in slim and high containers 111 no longer fall within the field of view of the radar fill level measuring device 100, i.e. that the radar radiation is focussed so well that, for example, measurements can be taken in the space between a wall of the container 111 and the agitator 112. Furthermore, larger signal bandwidths can be achieved at higher frequency ranges, both technically and in terms of radio regulation, which has the advantage to better distinguish echoes that are located close to each other.

While the antennas 102 in lower frequency ranges around 6 and 24 GHz can be fed using coaxial cables, the high attenuation properties of these cables in the frequency range around 80 GHz have led to a technological change, favouring the use of waveguides 104 for signal routing, as shown, for example, in FIGS. 1a and 1b. Waveguides 104 have very low attenuation properties in this frequency range and can be manufactured cost-efficiently in sufficient lengths.

Round horn antennas are frequently used as antennas 102, often provided with a dielectric filling and/or, as shown in FIGS. 1a and 1b, a dielectric lens 103 in order to reduce the length of the antenna horn.

High process temperatures pose a challenge for process measurement technology. Modern radar fill level measuring devices 100 can be equipped with antennas 102 that can measure processes involving temperatures of up to 450° C. However, the electronic system of such radar fill level measuring devices 100 are often only specified for temperatures of up to 85° C. This means that temperature decoupling must take place via the antenna 102 and the associated waveguide 104 or via the coaxial cables that may be used at lower frequencies. According to the state of the art, such temperature decoupling is realised using a long antenna in combination with a long waveguide 104 or a coaxial cable, sometimes in combination with additional cooling fins. Temperature simulations and measurements are used to design the required length.

A new generation of fill level measuring devices is now set to further utilise the existing positive effects associated with increasing the transmission frequency. By further increasing the frequency, for example, at frequencies around 180 GHz or even 240 GHz, the antennas of the measuring devices can be made even smaller, while still achieving antenna gains comparable to those at 80 GHz. Smaller antennas can be used to cover new fields of application in smaller containers or in factory automation, thus opening up new markets.

The necessary semiconductor technology, especially for the required radio frequency units, is already commercially available for the desired frequency ranges, and international efforts can be observed to regulate measuring devices that operate in this high radio frequency range.

However, state-of-the-art assembly and connection technology is inadequate for the desired application purpose.

The attenuation properties of coaxial cables are too high in a frequency range above 60 GHz for practical use in a fill level measuring device in which, due to the temperature requirements mentioned above, the antenna must be positioned far away from the sensor electronics and thus from the radio frequency unit. The longer such guides are, the higher is the signal attenuation that the signal experiences during transmission.

The waveguide technology used for radar fill level measuring devices with a transmission frequency of 80 GHz also faces increasing challenges at higher frequencies, especially above 110 GHz. The diameter of a round waveguide defines the frequency range in which the waveguide can be operated. In the case of a rectangular waveguide, i.e. a waveguide with a rectangular cross-section, the edge length of the longer side of the rectangle is decisive for the frequency range. As the frequency increases, the diameter or edge length of the waveguide decreases. While a round waveguide diameter of 2.6 mm can still be used at a frequency of 80 GHz, the diameter at 240 GHz is no more than about 0.87 mm.

The required length of such waveguides can be in the range of 4 cm-30 cm, due to the temperature problems described above. Round waveguides are often manufactured using a (deep-hole) drilling process or an erosion process. However, these drilling processes can only be used to produce drill holes having a maximum depth of about 30 times the drilling diameter, provided that the general requirements for mechanical accuracy and production costs are to remain within reasonable limits. Compared to erosion processes, drilling processes have the advantage that the surface roughness in the waveguide is very low, which is favourable for achieving low attenuation.

The cause of the increasing attenuation in the waveguide is the skin effect. The penetration depth of the charge carriers into the walls of the waveguide becomes increasingly smaller as the frequencies increase. As a result, the surface roughness of the metallic surface within the waveguide channel becomes increasingly relevant as the frequency increases. The greater the roughness of the surface, the greater the attenuation caused by the waveguide. This means that as the frequency increases, not only does the diameter of the waveguide decrease, as described above, but the requirements regarding the surface quality within the waveguide channel, i.e. in particular its surface roughness, will increase. These increasing requirements make the production of such waveguides complex and therefore expensive.

For very small waveguide diameters, deep-hole drilling methods are therefore only suitable for comparatively short waveguide lengths to enable the production of process-compatible round waveguides, as the required drilling depth can only be achieved with sufficient accuracy at great expense.

It is therefore an object of the present invention to provide a radar measuring device, in particular a radar fill level measuring device, which has a waveguide arranged between the radio frequency unit and the antenna and which can be operated at frequencies above 110 GHz while realising a distance of at least 5 cm between the radio frequency unit and the antenna.

It is a further object of the present invention to provide a manufacturing method for a waveguide which is suitable for guiding electromagnetic waves having frequencies above 110 GHz in a low loss manner, in particular between a radio frequency unit and an antenna.

These tasks are solved by a radar measuring device having the features of claim 1.

Preferred embodiments, features and characteristics of the radar measuring device as proposed hereinafter correspond to those of the method as proposed hereinabove, and vice versa.

Advantageous embodiments and variants of the invention are shown in the dependent claims and in the following description. The features listed individually in the dependent claims can be combined with each other and with the features explained in greater detail in the following description in any technically meaningful manner and can represent other advantageous embodiment variants of the invention.

A radar measuring device according to the invention having a radio frequency unit for generating and/or receiving electromagnetic waves using an antenna for directional radiation of the electromagnetic waves, wherein a waveguide for transmitting the electromagnetic waves is arranged between the radio frequency unit and the antenna, characterises itself in that the waveguide consists of two half-shells extending in the longitudinal direction of the waveguide.

The fact that the waveguide consists of two half-shells extending in the longitudinal direction of the waveguide makes it possible to produce waveguides of almost any given length and to use them in the radar measuring devices. The cavities that are to form the hollow space of the waveguide can be produced in the half-shells by machining processes, by casting processes, e.g. injection moulding or die casting, by extrusion processes, or in any other way. The aforementioned processes enable the half-shells to be manufactured very precisely.

According to the present application, a radio frequency unit is understood to be the part of a radar measuring device that generates, transmits, and receives radio frequency signals.

The longitudinal direction of the waveguide in this case refers to the waveguide's direction of extension from the radio frequency unit to the antenna.

The radar measuring device may, in particular, be a radar fill level measuring device. However, other radar measuring devices may also have the proposed design, e.g. devices for object identification or radar barriers as well as radar measuring devices for factory automation designed for measuring distances and speeds from and to objects.

In one embodiment, the waveguide can have a round cross-section. A round cross-section means that the hollow space in which the electromagnetic radiation is guided has a round, and in particular, a circular cross-section. This does not necessarily mean, however, that the outer contour of the waveguide also has a round or circular cross-section.

A separation plane defined by the half-shells of the waveguide bisects the waveguide in the longitudinal direction, i.e. the separation plane runs through a longitudinal axis of the waveguide hollow space and divides it into two halves. In the case of a waveguide with a circular cross-section, this means that the two half-shells each have a semi-circular cavity, so that after joining the two half-shells together, a channel with a circular cross-section, i.e. a circular cavity, is formed for guiding the electromagnetic waves.

Alternatively, the waveguide can have a rectangular cross-section, with a separation plane defined by the half-shells being oriented parallel to the shorter sides of the rectangle and preferably bisecting the longer sides. A configuration of this kind ensures that a sectional surface formed by joining the half-shells together has as little negative influence as possible on the properties of the waveguide. In this plane, the wall currents occurring in the waveguide are equal to zero, which means that any contact resistance that could arise through the sectional surfaces will have no effect on the transmission properties of the waveguide.

In an advantageous configuration, when considered in a cross-section of the rectangular waveguide, a length of a longer side of the rectangle is less than 2 mm, in particular less than 1 mm, preferably 1.3 mm or 0.86 mm.

In an advantageous further development, the half-shells have alignment elements, in particular self-centring alignment elements. Such alignment elements are used to align the half-shells relative to each other during an assembly process, i.e. when the half-shells are joined together to form the waveguide, so that the cavities formed in the half-shells are aligned with each other in such a manner that the desired waveguide cross-section is produced without steps or gaps in the transition area, i.e. at a joint edge between the half-shells. Thus, the transition between the half-shells is preferably formed without any steps or gaps. In particular, the alignment elements can be designed to be self-centring, i.e. the alignment elements are designed in such a manner that they align and position the two half-shells with respect to each other, for example by means of leading edges, chamfers or the like running along a longitudinal extension of the alignment elements when the half-shells are brought together, so that they merge into each other without any gaps or steps.

In one embodiment, the alignment elements may further be designed as connecting members for interconnecting the half-shells. This means that the alignment elements not only ensure the alignment and positioning of the half-shells with respect to each other, but at the same time interconnect them, in particular by fixing them to each other. This can be achieved, for example, by designing the alignment elements in such a way that they latch, hook or jam together so that the two half-shells are mounted, in particular fixed, to each other.

For example, the alignment elements and connecting members can be formed by openings and pins inserted into the openings, wherein, for example, the openings and/or the pins can have an undercut which is designed in such a way that the half-shells will latch in the joined state.

As an alternative to latching, the pins can also be pressed in so that they are held in the openings by an interference fit and the half-shells are interconnected in this way.

In one variant, the alignment elements and/or connecting members can be integrally formed with the half-shells. This means that the alignment elements and/or the connecting members are made of the same material as the half-shells and are fabricated, for example, during the manufacture of the half-shells. For example, the alignment elements and/or the connecting members can already be formed, in a respective tool, during an injection-moulding or die-casting process, so that they can be produced together with the half-shells in a single process step.

In one embodiment, the alignment elements and preferably also the connecting members are realised as openings and/or as pins arranged to correspond to the respective openings. The pins can either be formed together with one of the half-shells and engage with openings formed in the other half-shell, or both half-shells may have correspondingly formed openings into which separately formed pins, which may in particular be formed as dowel pins, are inserted. The pins may, for example, be used to achieve a press fit. For this purpose, the pins are pressed into the openings and thus simultaneously ensure that the half-shells are aligned at the same time as they are attached to each other.

It should be noted at this point that although the alignment elements and the connecting members are preferably realised by one element, they can also be realised as separate elements.

The half-shells can essentially be made of metal. Half-shells manufactured from metal have the advantage that metal is in itself electrically conductive and therefore no post-processing is required to achieve electrical conductivity. The half-shells can be manufactured from a solid material, for example using machining processes, or from semi-finished products or using corresponding casting processes, which are then respectively reworked.

Alternatively, a base body of the half-shells forming the waveguides can be made of plastic material. This body is ideally suited as a support material and can be made electrically conductive by metallizing it so as to obtain an appropriate thickness and surface quality. The plastic parts can, for example, be manufactured using an injection moulding process or an extrusion process and depending on the requirements for the dimensional accuracy of the parts can be reworked, for example using machining processes, before the metallisation is applied.

In one embodiment, the plastic half-shells are connected by means of metallic dowel pins.

Plastic materials often have poor thermal conductivity, which is why the use of plastic as a base body can achieve particularly good temperature decoupling between the antenna and the radio frequency unit. Particularly suitable plastic materials include polyether ether ketone (PEEK), polyoxymethylene (POM), and polyvinylidene fluoride (PVDF). These plastic materials have good chemical and thermal resistance as well as appropriate HF properties.

The half-shells can be metallised by sputtering or vapour deposition, or by gas phase deposition, for example.

Radar measuring devices often have to be used in process environments involving high process temperatures of several hundred degrees. To protect the electronic system, which is sensitive to high process temperatures, from these high temperatures, it is advantageous to increase the distance separating the hot process environment from the electronic system. In one embodiment, the waveguide therefore has a length of at least 4 cm, preferably more than 5 cm, more preferably more than 10 cm, in particular more than 15 cm, more than 20 cm or more than 30 cm.

The previously described design of a waveguide having two half-shells is particularly advantageous if the waveguide has a ratio of length to smallest extension in the cross-section of the waveguide, i.e. smallest extension of the waveguide channel, of greater than 30, preferably greater than 80, more preferably greater than 100, in particular greater than 150, in particular greater than 300. For waveguides in which this ratio is high, attaining, for example, a value of over 30 or over 80, as described above, the advantages in production are particularly evident, since deep-hole drilling is no longer possible as a production process or is very cost-intensive.

For circular waveguides having a circular cross-section, the smallest cross-sectional extension is deemed to be the diameter, and for rectangular waveguides having a rectangular cross-section, said smallest cross-sectional extension is deemed to be the length of the shorter edge.

A better signal quality of the radar signal emitted can be achieved if the attenuation of the signal emitted by the radio frequency unit, which takes place in the waveguide, is as low as possible. However, the attenuation of a waveguide increases with increasing frequency.

The cause of the increasing attenuation in the waveguide is the skin effect. The penetration depth of the charge carriers into the walls of the waveguide becomes increasingly smaller as the frequencies increase. As a result, the surface roughness of the metallic surface within the waveguide channel becomes increasingly relevant as the frequency increases. The greater the roughness of the surface, the greater the attenuation caused by the waveguide. This means that as the frequency increases, not only does the diameter of the waveguide decrease, as described above, but the requirements regarding the surface quality within the waveguide channel, i.e. in particular its surface roughness, will increase, which makes the manufacturing of such waveguides expensive.

It is therefore advantageous for the signal quality if an inner wall of the waveguide has a mean roughness value of less than 0.5 μm, preferably less than 0.1 μm.

In the present application, the inner wall of the waveguide is understood to be the wall delimiting the waveguide channel.

The mean roughness value is standardised in accordance with DIN EN ISO 4287:2010. To determine this measured value, the surface is scanned over a defined measuring distance and all differences in height and depth of the surface are recorded. After calculating the determined integral of this roughness curve on the measuring section, this result will then be divided by the length of the measuring section.

In a particularly relevant embodiment, the radar measuring device has an operating frequency of at least 120 GHz, preferably at least 180 GHz, more preferably at least 240 GHz.

In the present application, the operating frequency is to be understood as the respective frequency+/−20 GHz, preferably +/−10 GHz. Depending on the regulatory framework, narrower frequency ranges may also be envisaged. Typically, a mean frequency rounded to the nearest 10 GHz of the frequency range actually used by the radar measuring device is specified as the operating frequency. In a preferred configuration, the waveguide has galvanic isolation.

The galvanic isolation can, for example, be designed as an interruption of an electrically conductive layer, preferably a metallisation, of the waveguide.

Galvanic isolation ensures that the antenna is galvanically isolated from the electronic system of the measuring device.

In this case, galvanic isolation is defined as an isolation between the reference potential of the electronic system and the metallic parts of the antenna. This is necessary since otherwise, once the radar measuring device has been installed, the reference potential of the metal container would be directly connected to the reference potential of the sensor electronics via the waveguide, which could lead to malfunctions or even to a failure of the device.

In a practical embodiment, the waveguide has a fastening device. The fastening device is used to hold and fix the waveguide within the radar measuring device and can also align the waveguide relative to the antenna. The fastening device can, for example, be designed as a stop for an engaging piece permitting to screw or otherwise fasten the waveguide in position. Alternatively, the waveguide itself can have a thread by means of which it can, for example, be screwed onto the antenna or onto part of the housing.

For example, a pressure piece can interact with the stop and can simultaneously absorb pressure from the process chamber and direct the forces acting on the waveguide into the housing for dissipation.

The invention further includes a method for manufacturing a waveguide for a radar fill level measuring device

10 according to any of the preceding claims, wherein according to the invention the waveguide is made of two half-shells.

In one embodiment, the half-shells are made of a metal. The manufacturing process involving half-shells has the advantage that such half-shells are per se electrically conductive, due to the chosen material. However, if the manufacturing process involves metal, additional effort will be required for thermal decoupling.

In an alternative embodiment of the method, the half-shells are made of plastic material, in particular polyether ether ketone, polyoxymethylene, or polyvinylidene fluoride, and are then metallised.

In the following, the present invention will be explained in greater detail, with reference being made to the embodiment examples and to the attached figures.

IN THE DRAWINGS

Figure 3:
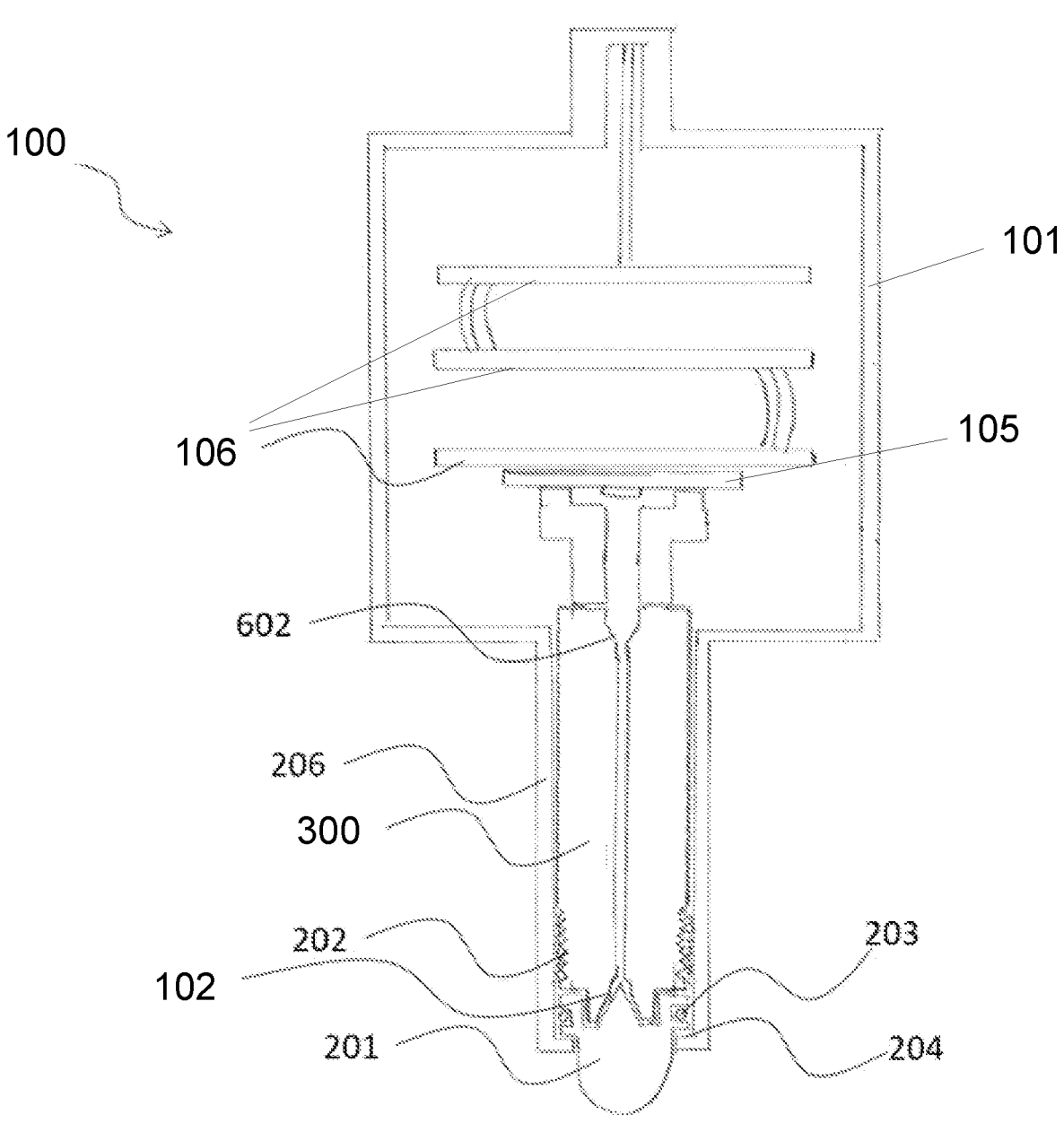
Figure 4:
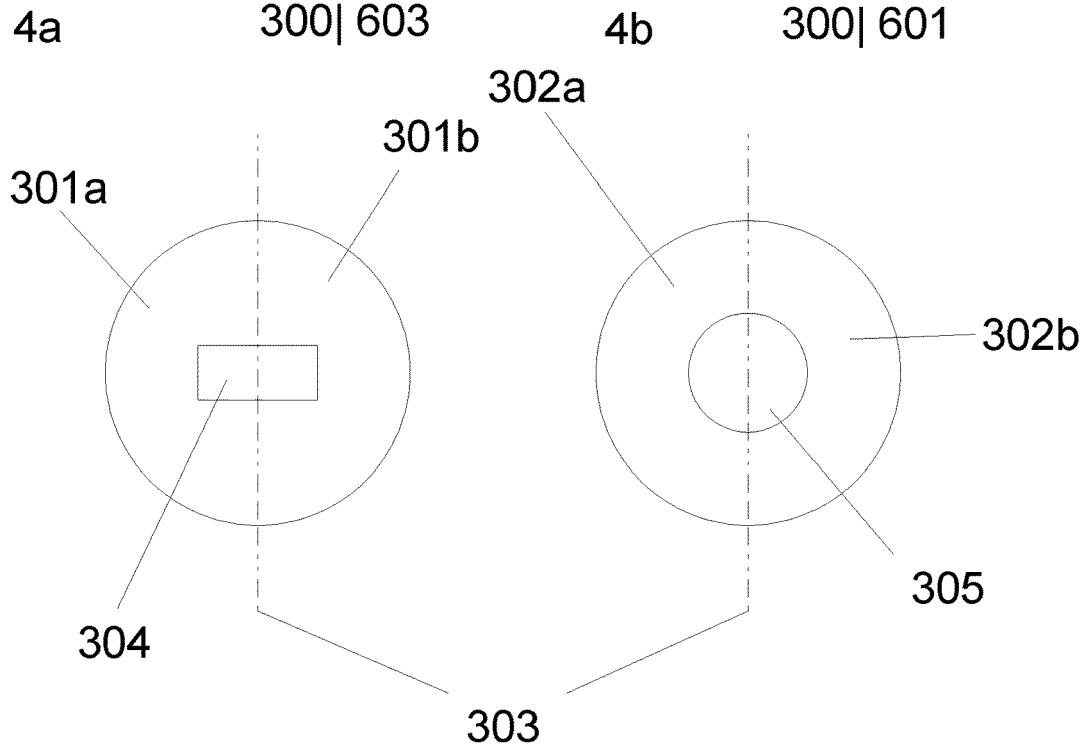
Figure 5:
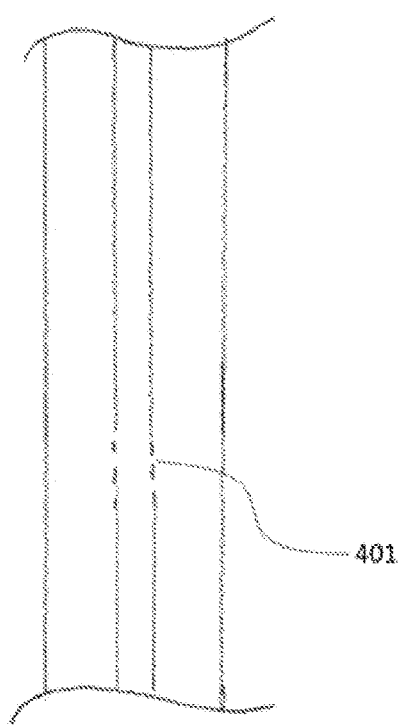
Figure 6:
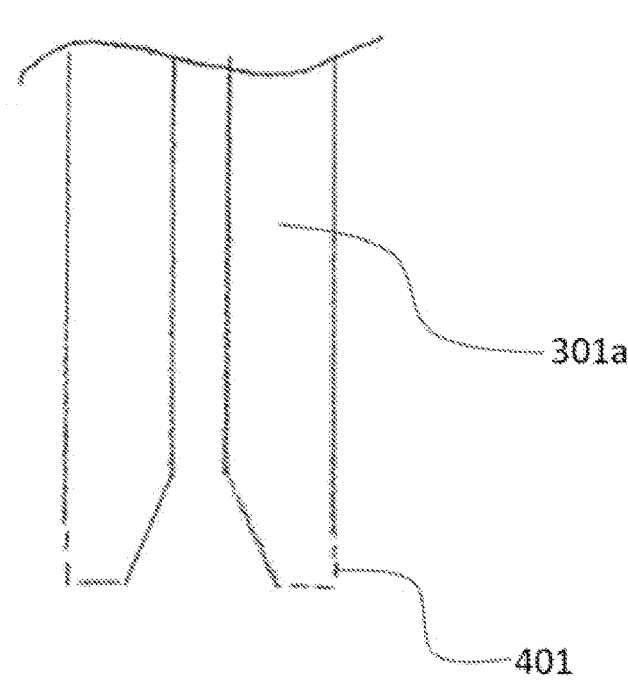
Figure 7:
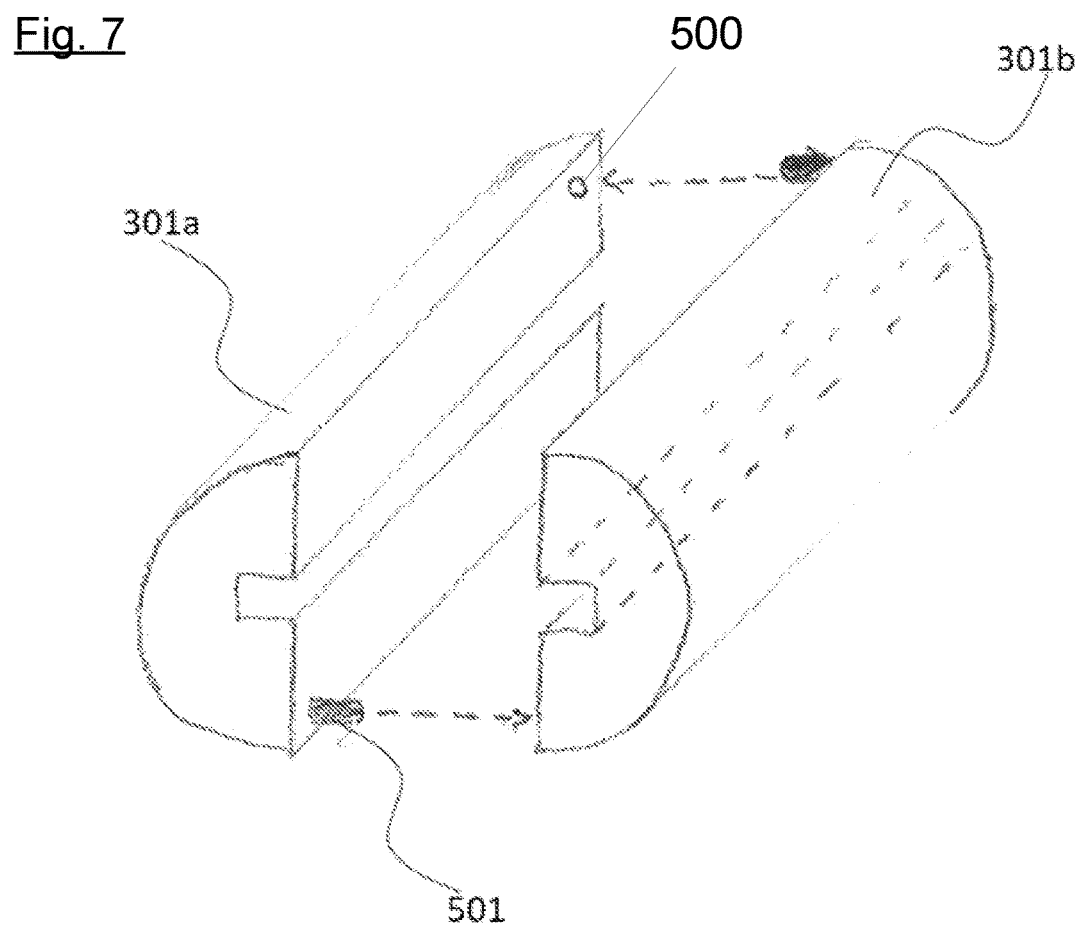
Figure 8:
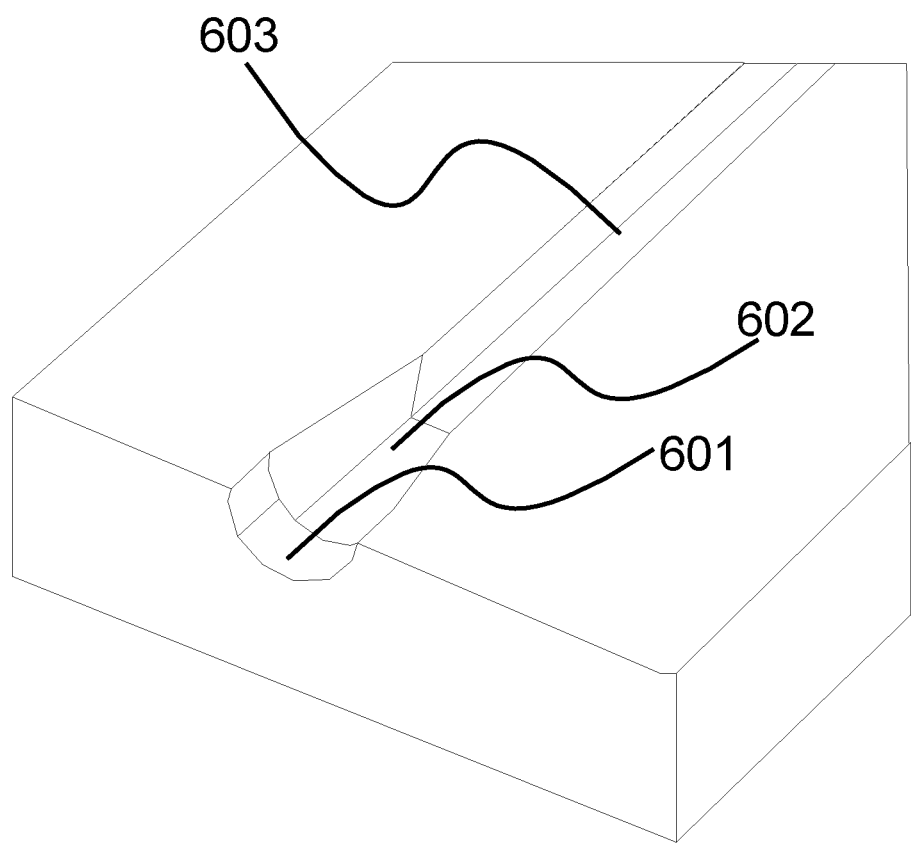
Figure 9:
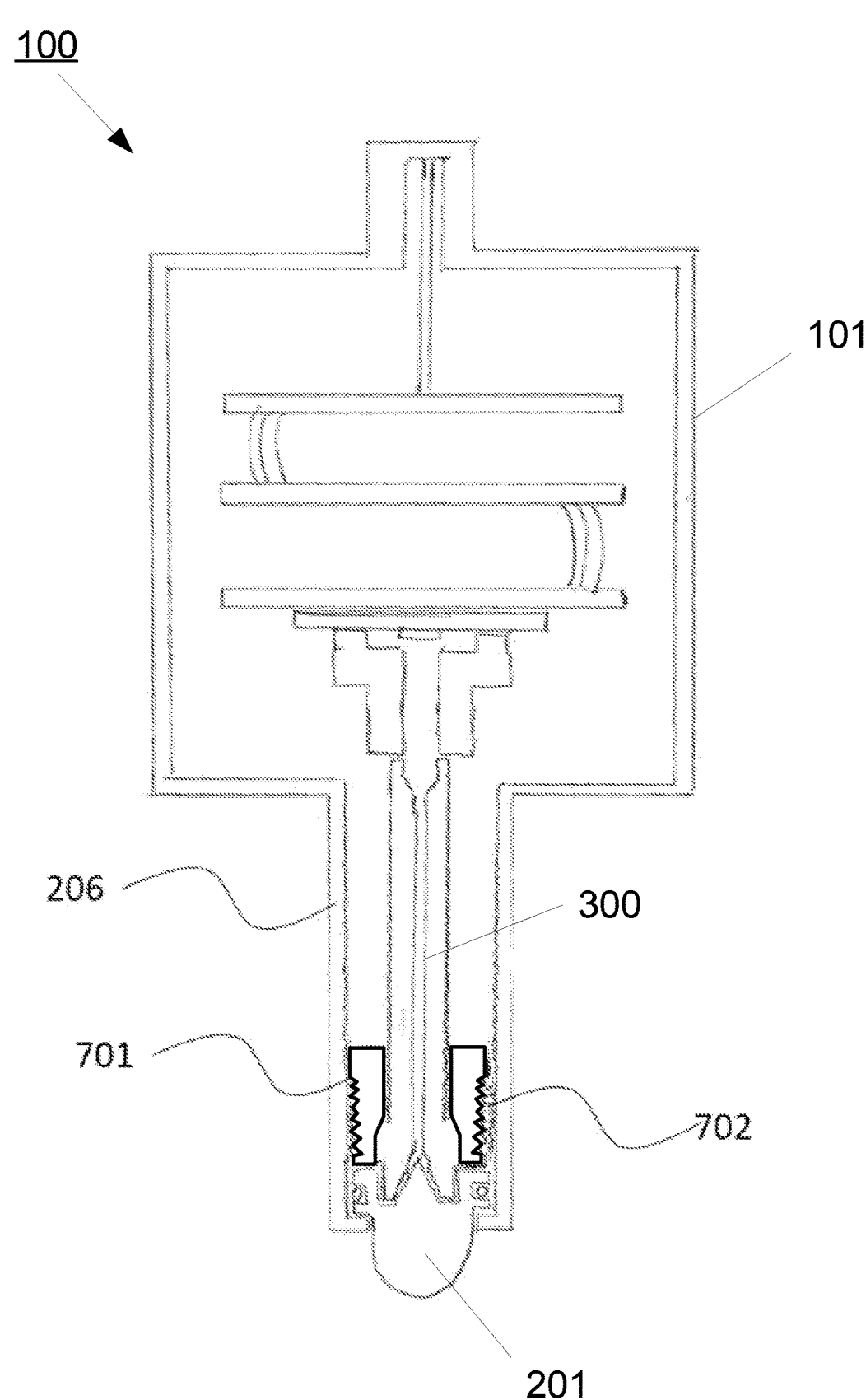

FIG. 1a is a radar measuring device known from the state of the art (already discussed), FIG. 1b is a configuration of a radar fill level measuring device according to the state of the art (already discussed), FIG. 2 is a possible application scenario for radar measuring devices as radar fill level measuring devices (already discussed), FIG. 3 schematically shows the structure of a radar measuring device of the present application according to a first embodiment example, FIG. 4 shows two Sub-Figures, illustrating two possible embodiments for the waveguide of FIG. 3, FIG. 5 shows a variant illustrating the galvanic isolation of the antenna with respect to the electronic system, FIG. 6 shows a variant illustrating the galvanic isolation of the antenna with respect to the container, FIG. 7 is a perspective representation of the rectangular waveguide of FIG. 4a, FIG. 8 is an embodiment of a half-shell of a waveguide, and FIG. 9 is an alternative embodiment for illustrating the assembly of the waveguide.

In the figures, unless otherwise indicated, identical reference signs denote identical or corresponding components with the same function.

FIG. 3 schematically shows the structure of a first embodiment example of a radar measuring device 100 according to the present application.

The radar measuring device 100 is designed as a radar fill level measuring device 100 with an operating frequency of 110 GHz. A housing 101 of the radar fill level measuring device 100 has several circuit boards 106 of an electronic system of the radar fill level measuring device 100 arranged thereon, on which, among other things, a radio frequency unit (hereinafter also referred to as RF unit) 105 for generating, transmitting, and receiving radio frequency signals is arranged.

The RF unit 105 is designed and arranged in such a manner that electromagnetic waves generated by it are coupled into a waveguide 300 and transmitted therein to an antenna 102, which in the present case is designed as a horn antenna. In the present embodiment example, the horn antenna 102 is integrally formed with the waveguide, i.e. the horn antenna is formed by a funnel-shaped flare of the waveguide 300 at a process-side end of the waveguide 300.

The horn antenna 102 has a dielectric filling 201 which is lens-shaped on the process side so as to focus the emitted electromagnetic radiation. In the present embodiment example, the waveguide 300 is designed to absorb mechanical forces occurring due to an overpressure in the container 111. In the present embodiment example, the waveguide 300 has an external thread 202 by means of which it is screwed to an outer tube 206 of the sensor. In this way, by means of the waveguide 300, the dielectric filling 201 of the antenna 102 is pressed against a stop 204 of the outer tube 206, thus sealing the radar fill level measuring device 100 against the process environment. In addition, the filling 201 also has a seal 203 in the form of an O-ring arranged in a circumferential groove, so that the penetration of process medium into the radar fill level measuring device 100 is effectively prevented.

Possible embodiments for the waveguide 300 are shown in FIG. 4 in Sub-FIGS. 4a and 4b. FIG. 4a shows the cross-section of a rectangular waveguide 603 and FIG. 4b shows the cross-section of a round waveguide 601. FIG. 4 clearly shows that the type of waveguide 300, i.e. whether the latter is a rectangular waveguide 603 or a round waveguide 601, is determined solely by the cross-sectional shape of the cavity of the waveguide 300, i.e. the contour of the cross-section of the waveguide channel 304, 305. If the waveguide channel 304 has a rectangular cross-section, it is referred to as a rectangular waveguide 603; if the waveguide channel 305 has a circular, round cross-section, it is referred to as a circular waveguide 301. The outer contour of the waveguide 300 can thus, for example, be adapted to structural constraints and/or to a mechanical load the waveguide 300 is subjected to.

The rectangular waveguide 603 according to FIG. 4a is formed of a first half-shell 301a and a second half-shell 301b, wherein a sectional plane 303 extends along a longitudinal axis of the waveguide and, in the cross-section shown in FIG. 4a, perpendicular to a longer edge of the rectangle of the waveguide channel 304. The sectional plane divides the rectangle of the rectangular waveguide 603 into two halves. The sectional plane 303 along which the waveguide channel is bisected is therefore parallel to the short edges of the waveguide channel and positioned centrally with respect to the long edges. In this plane, the wall currents occurring in the waveguide 603 are equal to zero, which means that any contact resistance that could arise through the sectional plane 303 will have no effect on the transmission properties of the waveguide 603.

FIG. 4b shows a round waveguide 601. The round waveguide 601 according to FIG. 4b is formed of a first half-shell 302a and a second half-shell 302b, wherein a sectional plane 303 extends along a longitudinal axis of the waveguide 601 and, in the cross-section shown in FIG. 4b, perpendicular to a diameter of the waveguide channel 305. The diameter of the circular contour in the embodiment example shown corresponds to the length of the longer side of the rectangle of the waveguide channel 304 of the rectangular waveguide 603 of FIG. 4a.

The half-shells 301a, 301b, 302a, 302b can be manufactured using a machining process as well as an injection moulding or die casting process, or a combination thereof.

As mentioned above, the half-shells may be made of metal, but plastic material or ceramic can also be used. If plastic or ceramic parts are used, these must be metallised in the region of the waveguide channel to make them suitable for being used as a waveguide.

The aforementioned manufacturing processes make it possible to produce waveguides of almost any given length. In order to prevent possible manufacturing tolerances caused by the injection moulding or die-casting process from affecting the end product, the parts produced by injection moulding or die-casting may, for example, be subsequently reworked using machining processes.

Basically, it is also possible to produce round waveguides in this manner, although, due to the sectional plane 303, the polarisation of the electromagnetic wave must in this case also be taken into account. Basically, it is also possible to manufacture waveguides according to the present application with sufficient precision using generative processes, such as laser sintering or 3D printing.

If the half-shells 301a, 301b, 302a, 302b are made of plastic material or ceramic, this not only enables low manufacturing costs but has the additional advantage of temperature decoupling between the process and the electronic unit. The antenna 102 must be designed in such a manner that the high process temperature of, for example, 150° C. does not cause the electronic system, particularly the RF unit 105, to heat up to over 85° C. Due to the low thermal conductivity of plastic materials and ceramics as compared to metal, these materials can help to optimise temperature decoupling between the process and the electronic system. For example, polyether ether ketone (PEEK), polyoxymethylene (POM), or polyvinylidene fluoride (PVDF) can be used as suitable plastic materials. The choice of which plastic material or ceramic is to be used will depend on the process conditions and on the mechanical stress the waveguide is subjected to.

When using a waveguide 300 made of plastic material or ceramic, various options are available for creating galvanic isolation between the electronic system and the antenna 102. Galvanic isolation is defined as an isolation between a reference potential of the electronic system, in particular the RF unit 105, and the metallic parts of the antenna 102. This isolation is obligatory, since otherwise, once the sensor 101 has been installed, the reference potential of, for example, the metal container 111 would be directly connected to the reference potential of the sensor electronics via the waveguide, which could lead to malfunctions or even to a failure of the radar measuring device 100.

FIG. 5 shows a first possibility for galvanic isolation. In the waveguide 300 as shown in FIG. 5, the metallisation of the inner wall of the waveguide 300 is interrupted in a section 401, i.e. in this section the non-conductive base body of the waveguide 300 is not metallised and therefore not electrically conductive. The section 401 may have a maximum length in the range of only a few wavelengths of the operating frequency of the waveguide 300, since attenuation caused by the interruption would otherwise become too dominant. In this first variant, galvanic isolation therefore takes place within the waveguide 300, between the antenna 102 and the electronic system.

Alternatively, as shown in FIG. 6, the galvanic isolation can be realised at the transition leading to the antenna 102 by completely metallizing the interior conductor, i.e. the waveguide channel of the waveguide 300, and the transition leading to the antenna 102, whereas the part outside the high-frequency relevant area in the region of the antenna 102 is not covered by metal. The latter embodiment example has virtually no influence on the waveguide attenuation and is therefore preferable. In this second variant, galvanic isolation thus takes place at the entry into the antenna 102 by preventing a conductive connection from being established between the container 111 or the outer tube 206 and the antenna 102.

FIG. 7 shows the rectangular waveguide 306 of FIG. 4a in a perspective view and with half-shells 301a, 301b separated from each other.

The half-shells 301a, 301b each have openings 500, e.g. holes, formed at diagonally opposite corners. In the present embodiment example, one of the openings 500 has a metal dowel pin 501 inserted therein which engages with the correspondingly arranged opening 500 formed in the respective other half-shell 301a, 301b when the half-shells 301a, 301b are joined together, so that the two half-shells 301a, 301b are aligned with each other and joined together. Since the edge length of the waveguide cross-sectional area is equal to, or smaller than, 1 mm, even small misalignments of the half-shells 301a, 301b will impair the transmission properties of the waveguide. The openings are therefore produced in an automated manner using a CNC process in order to minimise deviations.

In a further embodiment example, devices may be provided in advance on the waveguide half-shells 301a, 301b, 302a, 302b in order to ensure optimum positioning of the waveguide half-shells 301a, 301b, 302a, 302b during their assembly. For example, openings 500 and/or corresponding connecting pins can already be provided in the mould during injection moulding of the half-shell, so that any incorrect placement can be ruled out.

Alternatively, the half-shells can be screwed, glued, or clipped together (snap-in connection/clip connection/latching connection). Either the alignment is then carried out directly via this connection, or the half-shells are provided with corresponding alignment elements which ensure that the half-shells will be correctly aligned with each other before a mechanical connection is made.

Since the antennas used in process measurement technology are generally designed as round horn antennas 102, as shown in FIG. 3, they are often also fed via round waveguides 601. In order to feed a round waveguide 601 or, for that matter, a round horn antenna 102 using a rectangular waveguide 603, a transition piece 602 is often required to merge the rectangular cross-sectional area into a round cross-sectional area. A half-shell of this type can be seen in FIG. 8.

FIG. 8 shows an embodiment of a half-shell, for example the half-shell 301a of the rectangular waveguide 603 of FIG. 4a, in which the rectangular waveguide 603 is merged, by means of a transition piece 602, into a round waveguide 601 with a round contour for feeding a round horn antenna 102. Such transition pieces may be necessary, for example, if an RF unit 105 has a coupling for round waveguides 601, but for example due to simplified manufacture or lower costs, a rectangular waveguide 603 is to be used to bridge the distance between it and the antenna 102 and/or if the antenna 102 has a feed designed for receiving round waveguides or is designed as a horn antenna with a round cross-section.

FIG. 9 shows a further embodiment that enables the absorption of compressive forces from the process environment and dissipation of said forces into the housing 101 through the waveguide 300.

In this embodiment, the two half-shells 301a, 301b are press-fitted together by a pressure piece 701 having an external thread 702 and, as described in connection with FIG. 3, are pressed, jointly with the lens 201, against an abutment of the outer tube 206. The pressure piece 701 press-fits the two half-shells 301a, 301b together by means of a conical design of the pressure piece 701 and of the outer contour of the waveguide 300 while simultaneously centring them within the outer tube 208 and relative to each other. This embodiment has the advantage that the force that presses on the lens in the event of overpressure reigning in the container 105 is absorbed by a part other than the waveguide 300 and dissipated into the housing 101. This is particularly advantageous for waveguides 300 having a base body made of plastic material or ceramic. The pressure piece 701 may, for example, be made of metal.

This pressure piece 701 can equally be used for centring the half-shells 301a, 30b. With this variant, a positive-engagement connection using pegs or pins is not absolutely necessary since the mechanical support and centring is provided by the pressure piece 701, but can still be provided in addition.

REFERENCE SIGNS

100 radar measuring device/radar fill level measuring device
101 housing
101 sensor
102 horn antenna/antenna
103 lens
104, 300 waveguide
105 radio frequency unit
106 printed circuit boards
107 main lobes
110 filling medium
111 container
112 agitator
201 dielectric filling
202 external thread
203 seal
204 stop
206 outer tube
300 waveguide
301a first half-shell
301b second half-shell
302a first half-shell
302b second half-shell
303 sectional plane
304, 305 wave guide channel
401 section
500 opening
501 dowel pin
601, 604 round waveguide
602 transition piece
603 rectangular waveguide
701 pressure piece
702 external thread

The invention claimed is:

1. A radar measuring device having a radio frequency unit for generating and/or receiving electromagnetic waves using an antenna for directional radiation of the electromagnetic waves, comprising
    a waveguide for transmitting the electromagnetic waves at an operating frequency of at least 120 GHz between the radio frequency unit and the antenna, wherein
    a length of the waveguide in the longitudinal direction is greater than 30 times a smallest extension of the waveguide in cross-section, and
    the waveguide consists of two half-shells extending in the longitudinal direction of the waveguide.

2. The radar measuring device as claimed in claim 1, wherein the waveguide has a round cross-section, wherein a separation plane defined by the half-shells bisects the waveguide in a longitudinal direction.

3. The radar measuring device as claimed in claim 1, wherein the waveguide has a rectangular cross-section, with a separation plane defined by the half-shells being parallel to the shorter sides of the rectangle and bisecting the latter.

4. The radar measuring device as claimed in claim 3, wherein a length of a longer side of the rectangle is less than 2 mm.

5. The radar measuring device as claimed in claim 1, wherein the half-shells comprise self-centering alignment elements.

6. The radar measuring device as claimed in claim 5, wherein the alignment elements are connecting members for interconnecting the half-shells.

7. The radar measuring device as claimed in claim 5, wherein the alignment elements are integrally formed with the half-shells.

8. The radar measuring device as claimed in claim 5, wherein the alignment elements are realized as openings and as pins arranged so as to correspond to said openings.

9. The radar measuring device as claimed in claim 1, wherein the waveguide is made of metal.

10. The radar measuring device as claimed in claim 1, wherein the waveguide is formed of a plastic material coated with a metallization.

11. The radar measuring device as claimed in claim 1, wherein the waveguide has a length of at least 4 cm.

12. The radar measuring device as claimed in claim 1, wherein an inner wall of the waveguide has a mean roughness value of less than 0.5 μm.

13. The radar measuring device as claimed in claim 1, wherein the radar measuring device has an operating frequency of at least 120 GHz.

14. The radar measuring device as claimed in claim 1, wherein the waveguide provides galvanic isolation via an interruption of an electrically conductive layer.

15. The radar measuring device as claimed in claim 1, wherein the waveguide has a fastening device for an engaging piece and/or a thread.

* * * * *